United States Patent
Liu

(10) Patent No.: US 10,110,717 B1
(45) Date of Patent: Oct. 23, 2018

(54) SMARTPHONE WITH FLEXIBLE FOLDING SCREEN

(71) Applicant: Yongbiao Liu, Salinas, CA (US)

(72) Inventor: Yongbiao Liu, Salinas, CA (US)

(*) Notice: Subject to any disclaimer, the term of this patent is extended or adjusted under 35 U.S.C. 154(b) by 0 days.

(21) Appl. No.: 15/860,651

(22) Filed: Jan. 2, 2018

(51) Int. Cl.
  *H04M 1/02* (2006.01)
(52) U.S. Cl.
  CPC ....... *H04M 1/0216* (2013.01); *H04M 1/0268* (2013.01)
(58) Field of Classification Search
  None
  See application file for complete search history.

(56) References Cited

U.S. PATENT DOCUMENTS

| 9,348,450 B1* | 5/2016 | Kim | G06F 1/1681 |
| 2018/0107250 A1* | 4/2018 | Cho | G06F 1/1652 |
| 2018/0129246 A1* | 5/2018 | Ko | G06F 1/16 |

\* cited by examiner

*Primary Examiner* — Mohammed Rachedine

(57) ABSTRACT

A smartphone with flexible folding screen of the current invention comprises: a front body and a back body connected by hinges on the side, an exterior screen on the outer cover of the front body, a large flexible folding inner screen covering the inner covers of the front and back bodies, and a keyboard below the flexible screen. The invention further comprises a connection element with two ends in shape of rods serving as pins for the hinges connecting the front and back bodies and a long center portion having a flat surface on one side as a support plate for the flexible screen. The axis line of the rod ends is slightly above the surface of the support plate. The invention further comprises two swing panels on two sides of the support plate and the swing panels are flexibly jointed to the inner covers on the far side from the support plate and are isolated on other three sides. The swing panel, therefore, can swing downward when pressed from above. The front body and the back body have empty spaces underneath the swing panels to allow the swing panels to swing downward. The axis of the hinges is at or slightly above the surface level of the flexible screen so that the smartphone can fold fully. The flexible screen is permanently attached to the inner covers but is separated from or partially attached to the swing panels. The invention further comprises a plurality of mechanisms to control the swings of the swing panels to ensure a flat backing support for the flexible screen when the smartphone is at the full open position. When the smartphone is in open position, the support plate and the swing panel are at the same level with the inner covers of the front and back bodies and they together thereby provide smooth backing for the flexible screen. When the phone is in the folded position, the folding of the flexible screen results in curved folding of the flexible screen along the center line and the curving produces pressure on the swing panels and force the swing panels to swing toward the outer covers so that when the smartphone is in fully folded position the flexible screen has a curved folding along the center line and thereby has achieved folding without causing a crease to the flexible screen.

16 Claims, 14 Drawing Sheets

SMARTPHONE WITH FLEXIBLE FOLDING SCREEN

BACKGROUND OF THE INVENTION

1. Field of the Invention

The present invention relates to personal communication devices and handheld computers; and more particularly the present invention relates to smartphones for communication, business, entertainment, and other uses.

2. Description of the Related Art

Smartphones are essential devices of communication and access to internet. It is desirable that the phone is small enough to fit in hand comfortably but also have a large screen for better viewing experience. To achieve these purposes, various folding phones have been devised and flexible screens are also used. But no prior art has found to be similar to the present invention in a variety of ways.

SUMMARY OF THE INVENTION

As smartphones become the main devices for communication, receiving news, watching videos, and even conducting business, it is desirable to have large display screens. But it is also important to have suitable sizes to be comfortable to fit in hands and pockets. As flexible screen materials become available, it is become possible to have smartphones with folding screens to be able to have large screens for better viewing experience but still maintain proper sizes to be comfortably held in hands and carried in pockets of clothes.

The primary objective of the current invention is to provide a smartphone design with double screens: a regular exterior screen for common uses such as phone calls and texting and a larger flexible folding inner screen for viewing videos, reading and editing documents, and other uses. It is another objective to have a smartphone that is small enough to fit in hands and pockets when in folded position and large enough to give a comfortable viewing experience for entertainment and business applications. To achieve these objectives, the smartphone of the current invention comprises a front body and a back body connected by hinges on the side so that the front and back bodies can fold and open, an exterior screen on the outer cover of the front body, a large flexible folding inner screen covering the inner covers of the front and back bodies, and a keyboard below the flexible screen. The invention further comprises an elongated connection element with two rods at ends serving as pins for the hinges connecting the front and back bodies and the middle portion between the two ends having a narrow strip of flat surface on one side to serve as a support plate for the flexible screen and a curved surface on the other side to serve as a connection base between the front body and the back body. The invention further comprises a steering element attached to one of the end rods in a form of strip extending to the opposite direction of the support plate and the steering element is squeezed between the edges of the front body and the back body to keep the support plate facing upward position when the smartphone is fully unfolded. The axis line of the rods is slightly above the support plate. The smartphone of the current invention also comprises two swing panels adjacent to the two sides of the support plate. The swing panels are flexibly jointed to the inner covers on the sides far from the support plate and are isolated on other three sides and not connected to the support plate. The swing panel can swing downward when pressed down from above. The front body and the back body have empty spaces underneath the swing panels to allow the swing panels to swing downward. The axis of the hinges is at or slightly above the surface level of the flexible screen so that the smartphone can fold fully. The flexible screen is permanently attached to the inner covers but is not attached or only partially attached to the swing panels.

The invention further comprises a plurality of mechanisms to control the swings of the swing panels to achieve a flat backing support for the flexible screen when the smartphone is at the full open position. When the smartphone is in the full open position, the support plate and the swing panels are at the same level with the inner covers of the front and back bodies and they together thereby provide flat backing for the flexible screen. When the smartphone is being folded, the folding of the flexible screen forces the swing panels to swing toward the outer covers to create a space to form a curved folding without causing a crease to the flexible screen.

One of the plurality of methods for maintaining the swing panels to the same level as the support plate comprises one or more metal strips from the underneath of the inner covers or the interior surfaces of the outer covers and press upward on the bottom surfaces of the swing panels and one or more barrier elements at the edges of the swing panels to prevent the swing panels from being pushed above the support plate. Additionally, small magnets can be used together with the barrier elements and ferrous metal can be used in the support plate. The attraction force of the magnets to the ferrous metal further strengths the holding force to maintain the swing panels at the same level as the support plate.

Another mechanism to keep the swing panels to the same level as the support plate comprises one or more compression springs between the swing panels and the outer covers. As the smartphone folds, the folding of the flexible screen creates pressure force which overcome the pressure of the springs and forces swings of the swing panels to enable the flexible screen to have a curved folding. When the smartphone unfolds, the springs underneath the swing panels press the swing panels swing upward. One or more strings with a constant length are attached between the swing panels and the outer covers to restrict the upward swing of the swing panels to the same level as the support plate to maintain a flat backing surface for the flexible screen.

The smartphone in the present invention further comprise a mechanism to connect the front body and the back body with the connection base, the outer covers of the front and back bodies each has a strip of flexible membrane along the edge next to the support plate, the flexible strips are sandwiched between a curved back of the support plate and a cover plate and secured with screws to enable to fold and unfold the smartphone and keep the interior of the smartphone sealed.

The smartphone in the present invention also has all necessary keys for operations and connection jacks for power and earphone and sensors including camera lenses and microphone. The smartphone also comprises all necessary elements for its functions including microprocessors, a data storage unit, battery, various sensors, and motors embedded in the front body and the back body and not identified individually in the present invention.

The present invention has advantages of allowing curved folding of flexible screen and prevent causing a crease to the flexible screen when the smartphone is folded, and, thereby, makes it possible to have a large flexible folding screen on a smartphone. The described features and specifications may be combined in any suitable manner in one or more embodiments. One skilled in the relevant art will recognize that the invention can be practiced without one or more of the specific features or advantages of a particular embodiment.

Definitions

Front body: the left part of the smartphone when the phone is unfolded. Back body: the left part of the phone when the phone is unfolded. Outer cover: the cover or shell exposed to outside when the phone is folded. Inner cover: the cover which is sealed in the middle when the phone is folded and is exposed when the phone is unfolded. Front cover: the outer cover of the front body. The back cover: the outer cover of the back body. Open position: unfolded position.

DETAILED DESCRIPTION

Figure 1:
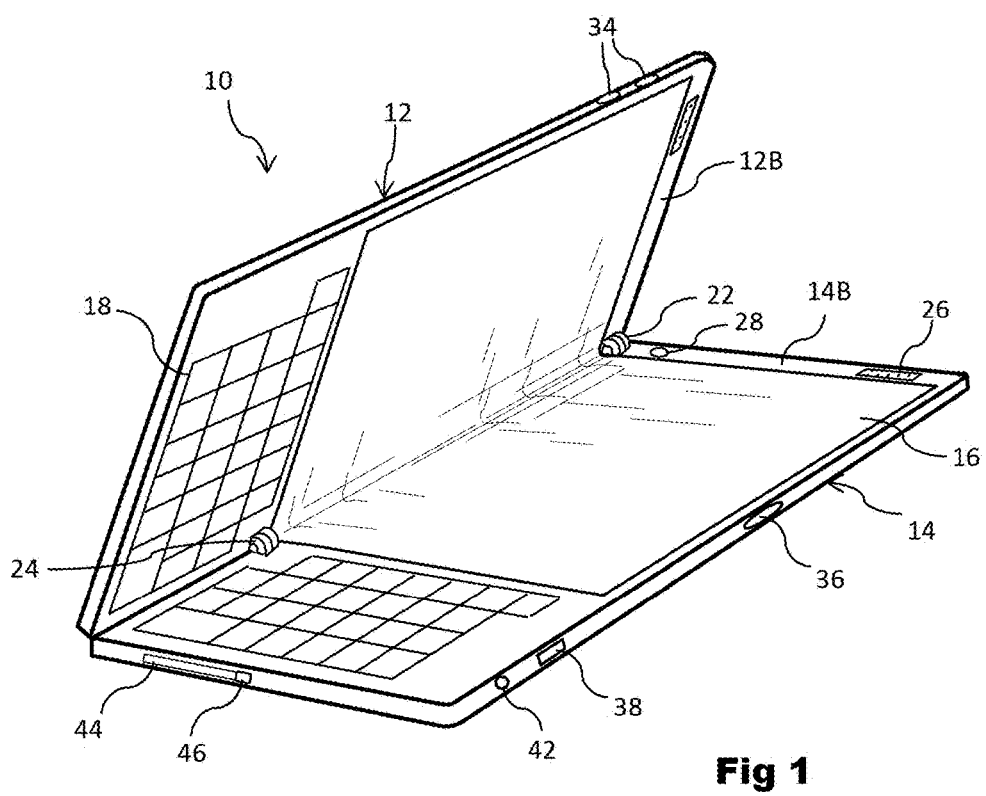
FIG. 1 is a perspective view of a preferred embodiment of the present invention.

With reference to FIG. 1 for the preferred embodiment 10, the smartphone with flexible folding screen comprises a front body 12, a back body 14, two hinges 22, 24 connecting the front body 12 and the back body 14, a flexible inner screen 16 covering the inner cover 12B of the front body 12 and the inner cover 14B of the back body 14, a keyboard 18. The embodiment 10 further comprises a camera 28, a pair of speakers 26, volume keys 34, a screen on/off key 36, a power jack 38, and an earphone jack 42. The embodiment 10 further comprises an internal channel with an open slit 44 to accommodate a sliding pin with a handle 46.

Figure 2:
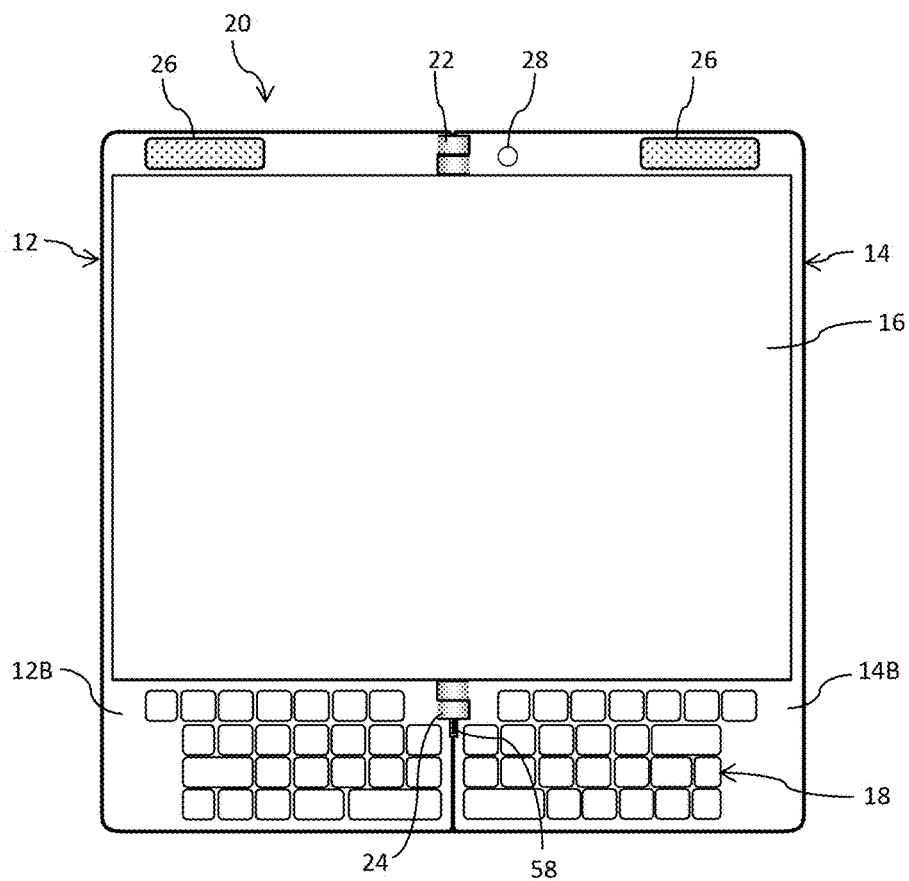
FIG. 2 is a top view of the preferred embodiment of the folding smartphone at full open position of the present invention.

With reference to FIG. 2, a top view 20 of the preferred embodiment of the smartphone at a fully unfolded position shows that the front body 12 and the back body 14 are connected on the side by the hinges 22 and 24 at the top and the bottom. The flexible screen 16 covers the upper portions of the inner covers 12B, 14B of the front body 12 and the back body 14. The embodiment also comprises a keyboard 18 positioned below the flexible screen 16. The embodiment also comprise a steering element 58 squeezed between the edges of the front body 12 and the back body 14 when the smartphone is fully open.

Figure 3:
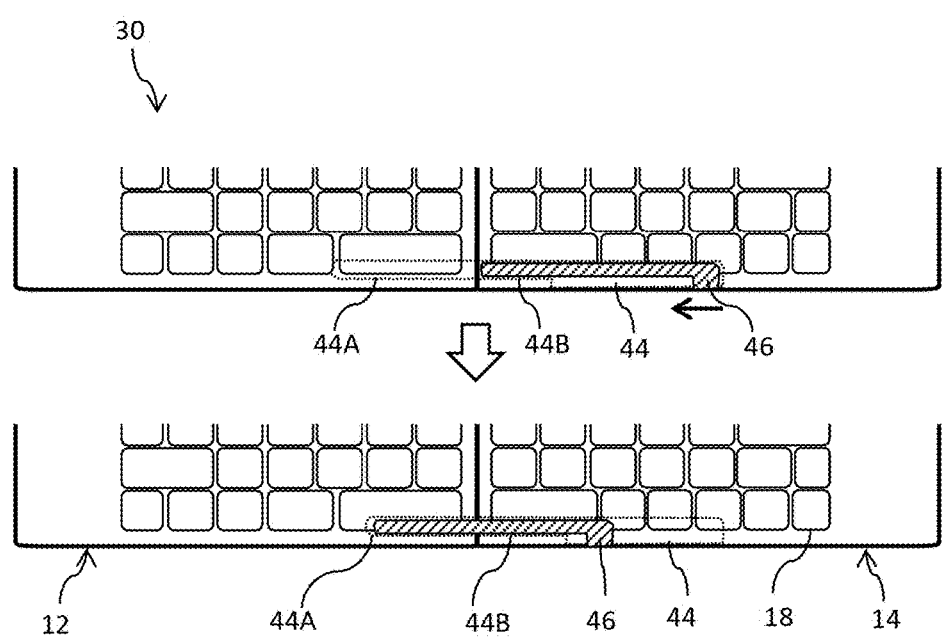
FIG. 3 is a schematic drawing of the top view of the low portion of the smartphone at full open position to show a mechanism to lock the two sides of the phone at a stable open position.

With reference to FIG. 3, a top view 30 of the preferred embodiment also shows two channels 44A, 44B within the bottom edges of the front body 12 and the back body 14 and the two channels form a continuous channel when the smartphone is fully unfolded. The channel 44B also has an open slit 44. The embodiment also comprises a sliding pin with a side handle 46 fitted in the channel 44B and can slide along the open slit 44. When the smartphone is fully unfolded, the slide pin 46 can be slide toward left into the channel 44A to lock both the front body 12 and the back body 14 at the same plane.

Figure 4:
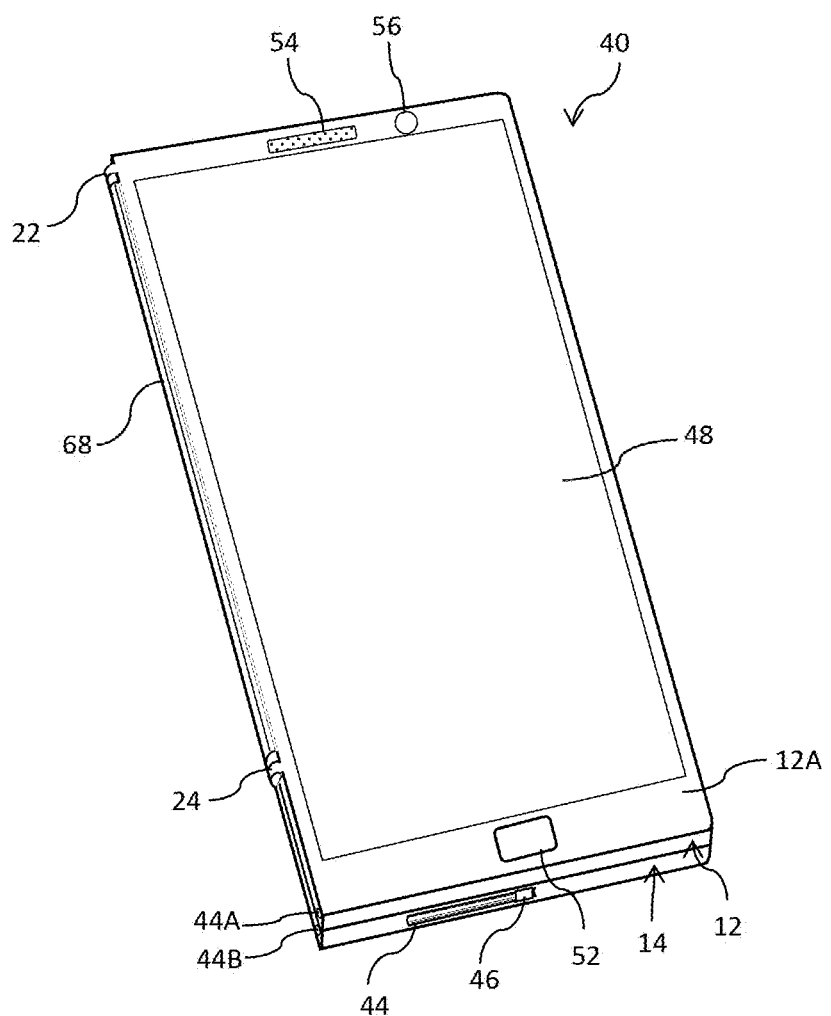
FIG. 4 is a perspective top view of the preferred embodiment of the smartphone at folded position of the present invention.

With references to FIG. 4, a perspective view 40 of the preferred embodiment also shows an external screen 48 on the outer cover 12A of the front body 12, a speaker 54 and a camera lens 56 above the screen 48, a home key 52 below the screen 48, and a connection element 68, and two hinges 22, 24 connecting the front body 12 and the back body 14 on the side. The openings of the channels 44A, 44B are shown on sides of the front body 12 and the back body 14 and the opening slit 44 of the channel 44B and the end of the slide pin 46 are in the bottom edge of the back body 14.

Figure 5:
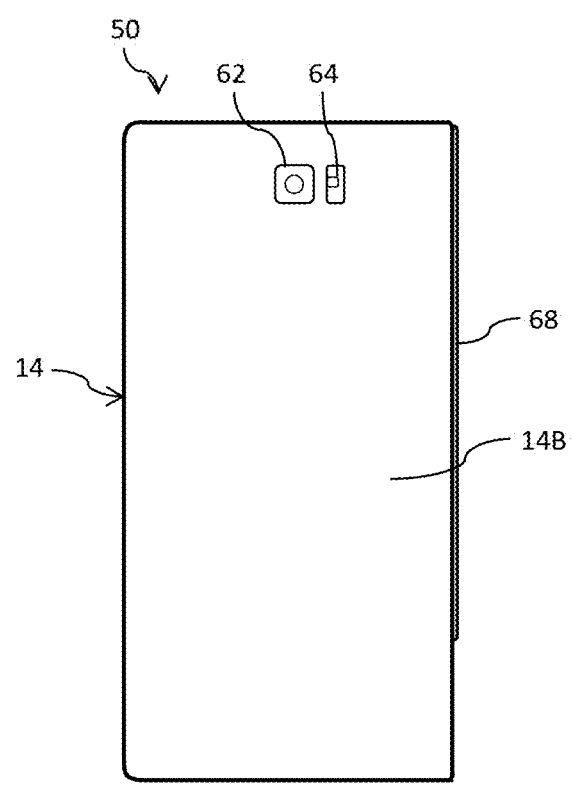
FIG. 5 is a back view of the preferred embodiment of the present invention.

With reference to FIG. 5, a rear view 50 of the back body 14 of the preferred embodiment shows a back cover 14B, a camera 62, a flash bulb 64, and the connection element 68.

Figure 6:
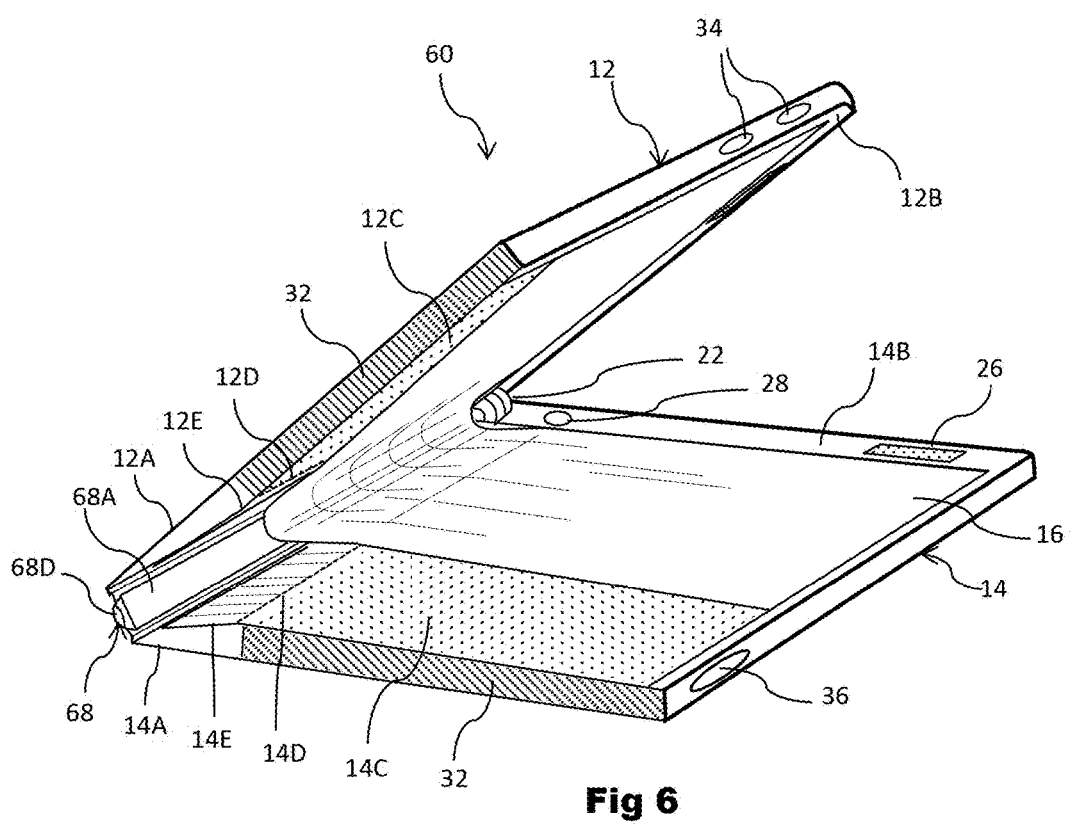
FIG. 6 is a perspective dissection view of the preferred embodiment of the smartphone at a partially folded position of the present invention showing the back support of flexible folding screen and folding of the flexible screen.

With reference to FIG. 6, a perspective view 60 of horizontal dissections of the flexible screen 16 and the front and the back bodies 12, 14 of the preferred embodiment of the smartphone shows that the flexible screen 16 is permanently attached to surface areas 12C, 14C on the inner covers 12B, 14B of the front body 12 and the back body 14 respectively. The preferred embodiment of the smartphone is at a partially folded state with the flexible screen 16 folded. Two swing panels 12E, 14E are flexibly jointed along lines 12D, 14D with inner surfaces areas 12C, 14C respectively. The space 32 between the outer covers 12A, 14A and the inner covers 12C, 14C are filled with unidentified internal components of the smartphone and the space between the swing panels 12E, 14E and the outer covers 12A, 14A are largely empty to accommodate the swings of the swing panels 12E, 14E. The connection element 68 for connecting the front body 12 and the back body 14 has a support plate 68A on the top and a curved back covered with a back cover element 68D. Also shown in FIG. 6, as the front body 12 folds toward the back body 14, the folding of the flexible screen 16 forces the swing panels 12E, 14E to swing toward the outer covers 12A, 14A and thereby the flexible screen 16 has space to make a curved folding to prevent a sharp crease of the flexible screen 16.

Figure 7:
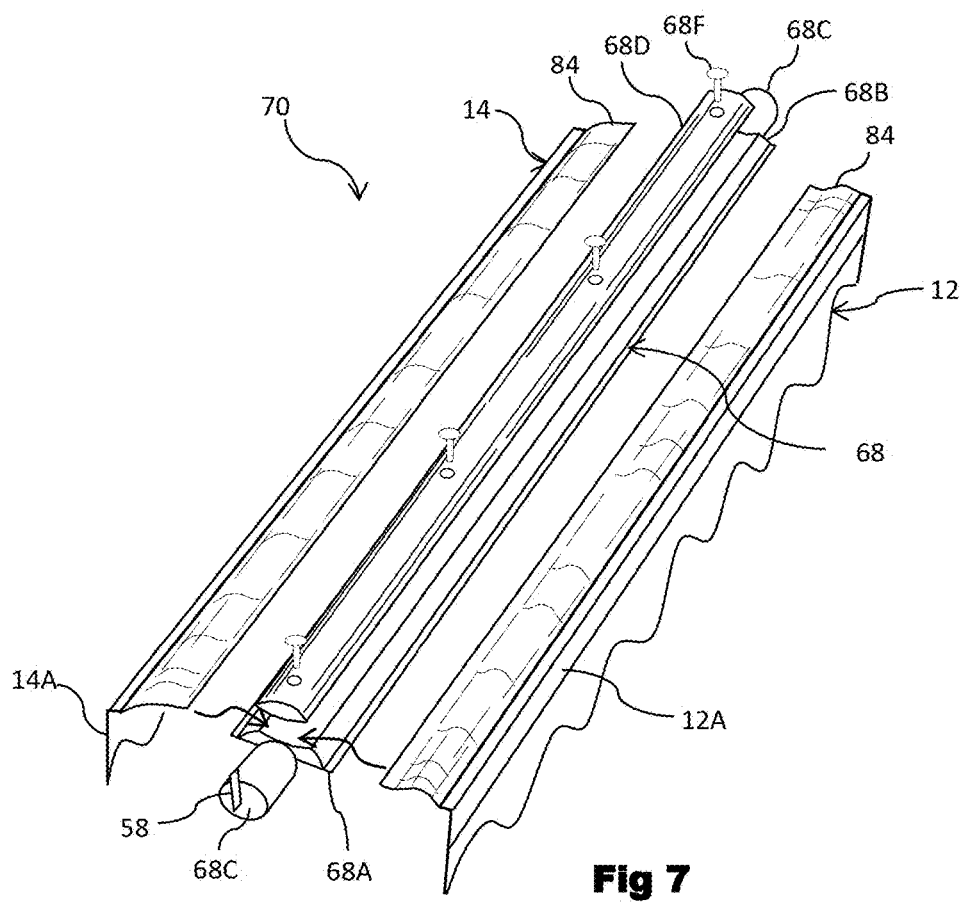
FIG. 7 is a rear perspective view of the preferred embodiment of the smartphone of the present invention with components disassembled showing individual components and the method they are assembled.

With reference to FIG. 7, a perspective view 70 of the connection between the front body 12 and the back body 14 of the preferred embodiment shows that the connection element 68 has the support plate 68A, curved back 68B, and two end rods 68C. Furthermore the outer cover 12A of the front body 12 and the outer cover 14A of the back body 14 each has a strip of flexible membrane 84 and the flexible membranes 84 are extended over the curved back 68B of the connection element 68 and are sandwiched between the curved back 68B and the back cover plate 68D. The flexible membranes 84 are securely fixed to the connection element 68 with screws 68F. Furthermore, the steering element 102 is in the form of strip at the end of the rod 24. When the smartphone is fully unfolded, the steering element 58 is squeezed between the two edges of the front body 12 and the back body 14 as shown in FIG. 2 and thereby keeps the support plate 68A facing upward.

Figure 8:
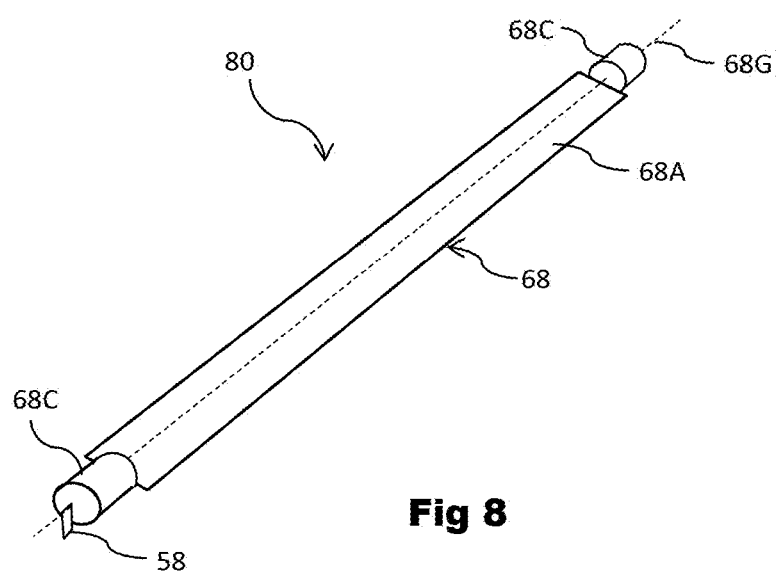
FIG. 8 is a perspective view of a connection element between the front body and the back body of the preferred embodiment of the present invention.

With reference to FIG. 8, a perspective view 80 of the connection element 68 has the support plate 68A in between the two end rods 68C and the support plate 68A is positioned below the axis line 68G of the end rods 68C. The steering element 58 is attached to the end rod 24 and extends toward the opposite direction of the surface of the support plate 68A.

Figure 9:
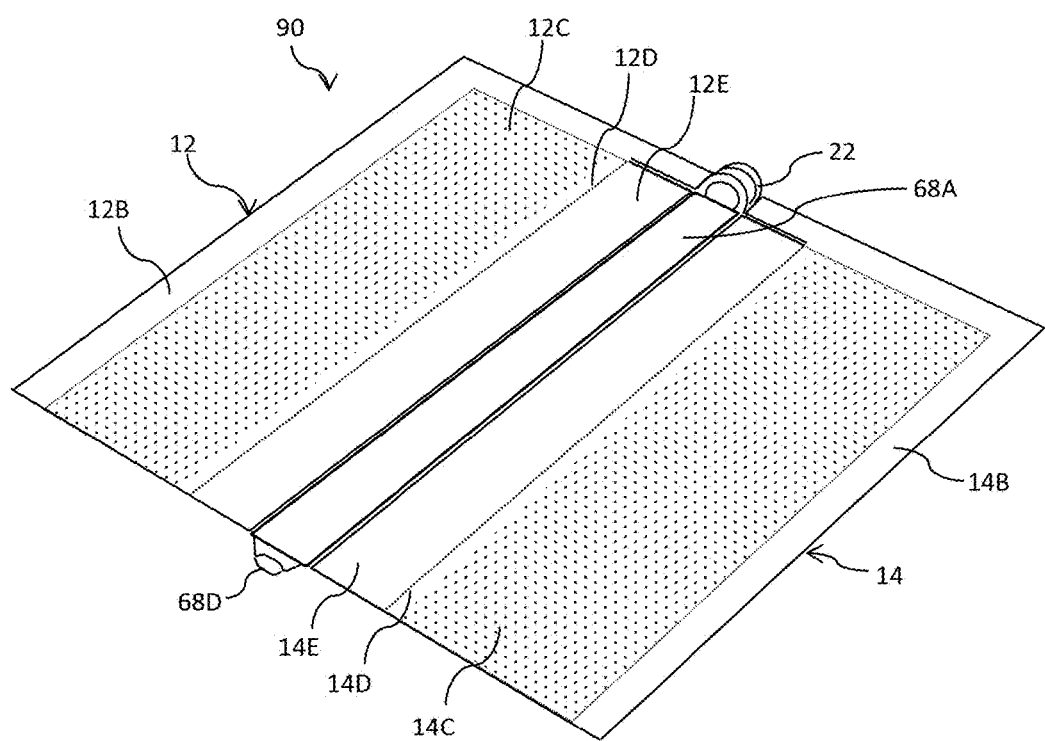
FIG. 9 is a perspective schematic view of the interior surfaces underneath the flexible screen of the preferred embodiment of the smartphone of the present invention.
Figure 10:
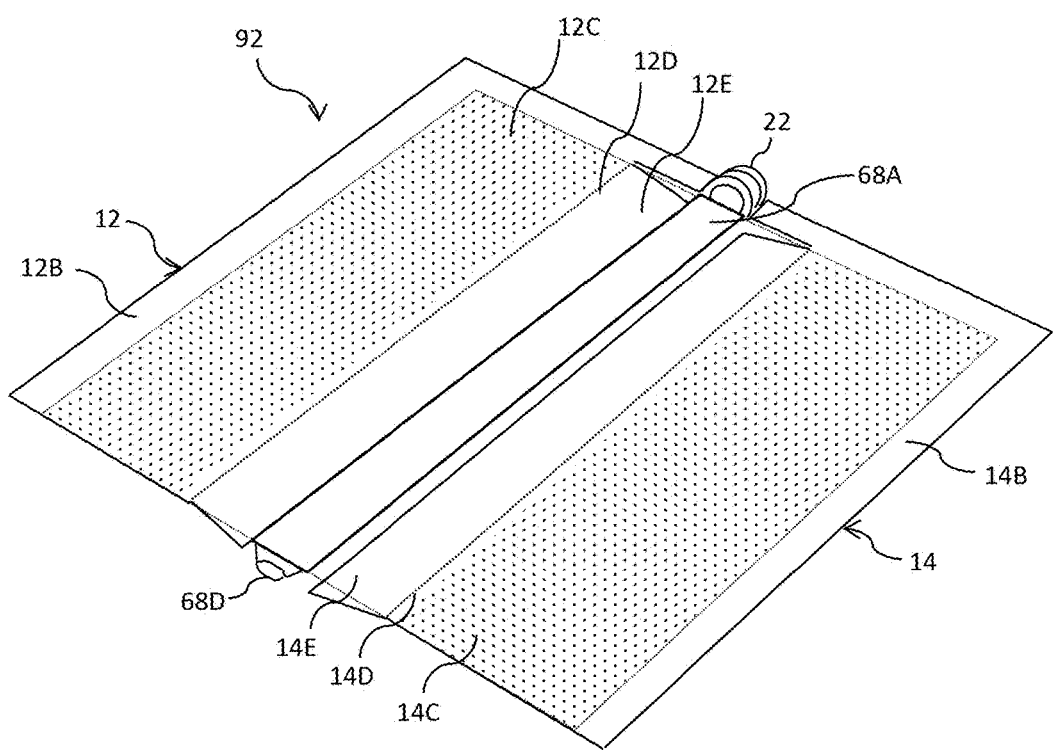
FIG. 10 is another perspective schematic view of the interior surfaces underneath the flexible screen of the preferred embodiment of the smartphone of the present invention.

With reference to FIGS. 9 and 10, perspective views 90, 92 of the inner covers 12B, 14B of the front body 12 and the back body 14 of the preferred embodiment of the smartphone without the flexible screen show that the inner covers 12B, 14B have areas 12C, 14C for attaching the flexible screen 16 permanently as in FIG. 6. The swing panels 12E, 14E are jointed along a line 12D, 14D with the inner surfaces areas 12C, 14C. With reference to FIG. 9, the perspective view 90 shows the inner covers 12B, 14B, the swing panels 12E, 14E, and the support plate 68A form a flat backing for the flexible screen 16 as in FIG. 6. With reference to FIG. 10, the perspective view 92 shows the swing panels 68A are pressed to swing downward and one side of the swing panels 12E, 14E are below the support plate 68A.

Figure 11:
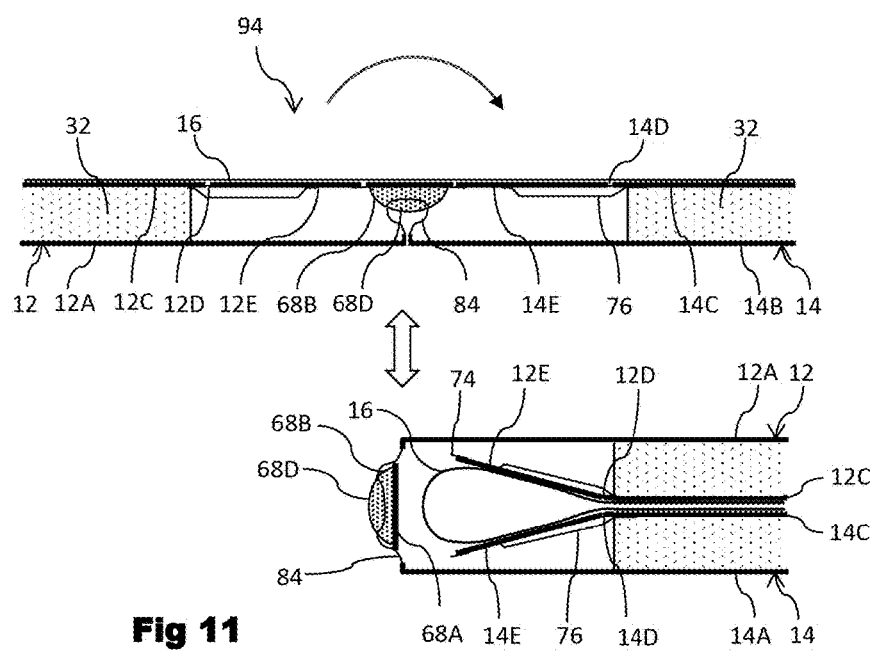
FIG. 11 is a schematic side view of cross section of a preferred embodiment of the present invention showing mechanism of keeping a flat surface of the swing panels and the support plates underneath the flexible screen.

With reference to FIG. 11, a side schematic view 94 of a horizontal dissection of the embodiment of the smartphone of the present invention shows a mechanism to keep a flat backing for the flexible screen 16. The swing panels 12E, 14E are pressed upward from below by one or more metal strips 76. The edges of the swing panels have barrier elements 96 which restrict the swing panels from being pushed above the support plate 68A. The flexible membranes 84 of the outer covers 12A, 14A are attached to the curved back 68B and sealed underneath the back cover 68D. As the smartphone folds, the folding of the flexible screen 16 forces swings of the swing panels 12E, 14E to create a space for the flexible screen 16 to make a curved folding. The spaces 32 between the areas 12C, 14C of the inner covers 12B, 14B and the outer cover 12A, 14A house unidentified internal components of the smartphone.

Figure 12:
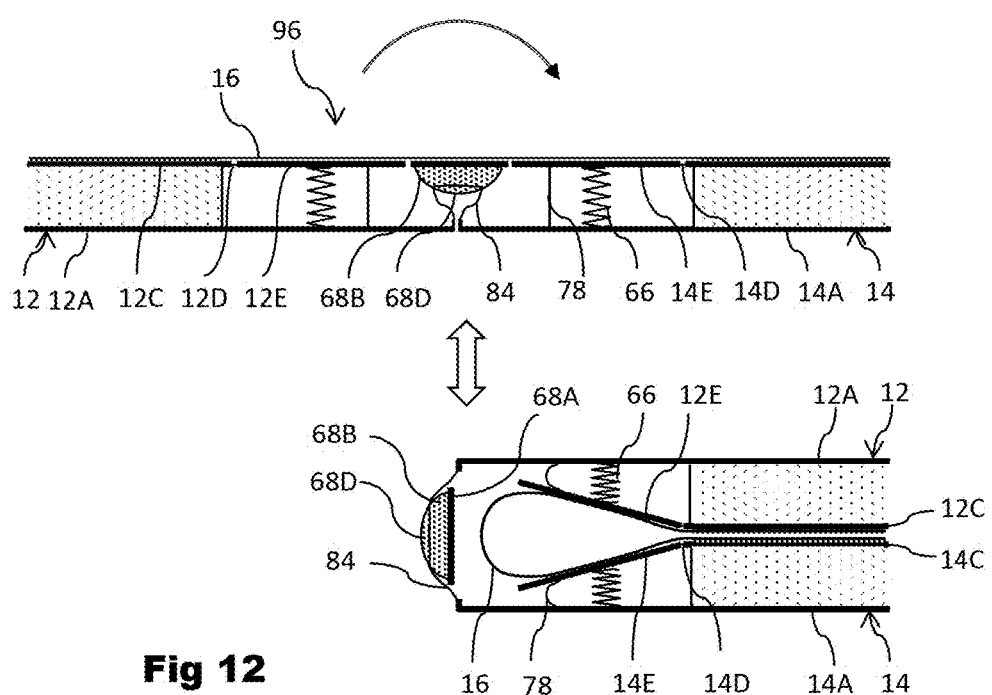
FIG. 12 is a schematic side view of cross section of a second preferred embodiment of the present invention showing mechanism of keeping a flat surface of the swing panels and the support plates underneath the flexible screen.

With reference to FIG. 12, a side schematic view 96 of a horizontal dissection of the embodiment of the smartphone of the present invention shows another mechanism to keep a flat backing for the flexible screen 16. The swing panels 12E, 14E are pressured upward by one or more compression springs 66 and one or more strings 78 of a constant length are attached to the swing panels 12E, 14E and the outer covers 12A, 14A so to restrict the swing panels from being pressured above the support plate 68A. As the smartphone folds, the folding of the flexible screen 16 forces swings of the swing panels 12E, 14E to create a space for the flexible screen 16 to make a curved folding.

Figure 13:
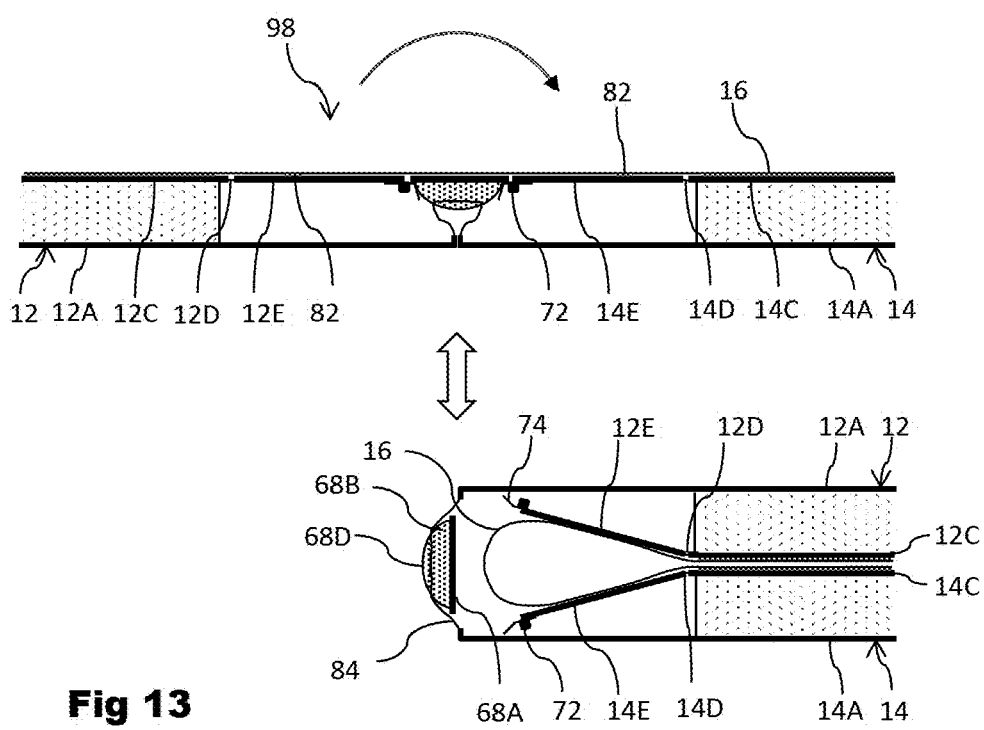
FIG. 13 is a schematic side view of cross section of a third preferred embodiment of the present invention showing mechanism of keeping a flat surface of the swing panels and the support plates underneath the flexible screen.

With reference to FIG. 13, a side schematic view 98 of a horizontal dissection of the embodiment of the smartphone of the present invention shows still another mechanism to keep a flat backing for the flexible screen 16. The flexible screen 16 is attached to the swing panels 12E, 14E at one or more locations 82. There are one or more small magnets 72 and barrier elements 74 at the edges of the swing panels 12E, 14E. The support plate contains ferrous metal and the attraction force of the magnets 72 and the barrier elements 74 keep the swing panels at the same level as the support plate. As the smartphone folds, the flexible screen 16 folds and forces swing of the swing panels 12E, 14E to create a space for soft curved folding of the flexible screen 16 and the swing panels 12E, 14E remain attached to the flexible screen 16 as the flexible screen 16 is attached to the swing panels at locations 82.

Figure 14:
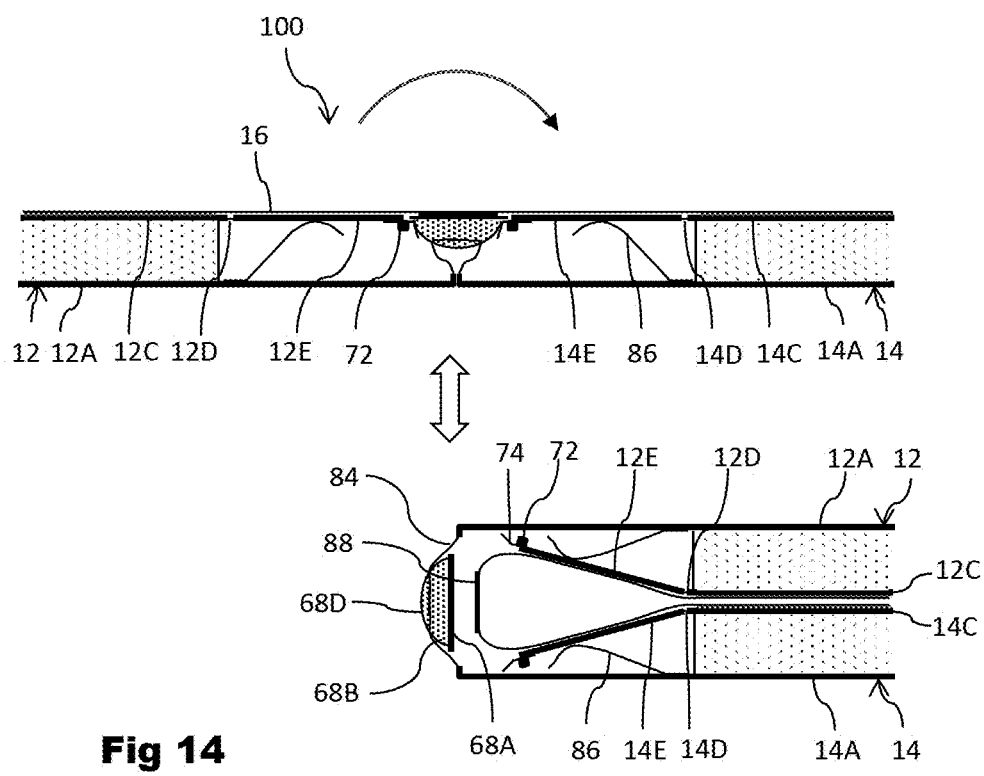
FIG. 14 is a schematic side view of cross section of a fourth preferred embodiment of the present invention showing mechanism of keeping a flat surface of the swing panels and the support plates underneath the flexible screen.

With reference to FIG. 14, a side schematic view 100 of a horizontal dissection of the embodiment of the smartphone of the present invention shows still another mechanism to keep a flat backing for the flexible screen 16. The mechanism comprises one or more metal strips from the outer covers 12A, 14A exerting pressure to the bottom surfaces of the swing panels 12E, 14E, one or more small magnets 72 and barrier elements 74 along the edges of the swing panels 12E, 14E. The support plate 68A contains ferrous metal and the attraction force of the magnets 72 and the barrier elements 74 keep the swing panels 12E, 14E at the same level as the support plate 68A. A strip of the flexible screen 16 positioned above the support plate 68A has a rigid backing 88. As the smartphone folds, the flexible screen has curved folds at the two sides of the rigid backing strip 88 and overcome the attraction forces of the magnets 72 and the pressure from the metal strips 86.

The invention claimed is:

1. A smartphone with flexible folding screen comprises: a front body, a back body, a connection element which connects the front body and the back body on the side, a flexible folding screen expanding over the inner covers of the front body and the back body, the inner covers of the front body and the back body each has a vertically oriented swing panel next to the connection element between the front body and the back body and the swing panels are flexibly jointed with the inner covers on the sides far from the connection between the front body and the back body and are isolated on the other three sides, furthermore the swing panels can swing downward pivoting along the joint line with the inner cover when pressed from above, furthermore the flexible screen is permanently attached to the inner covers of both the front body and the back body, furthermore the front body and the back body have empty spaces underneath the swing panels to allow the swing panels to swing downward toward the outer covers of the front body and the back body.

2. The smartphone with flexible folding screen as in the claim 1, wherein the connection element has two rod-shaped ends to serve as pins for two hinges connecting the front body and the back body and has a middle section with flat surface as a support plate at or below the axis line of the end rods to serve as backing support for the flexible screen, furthermore, the swing panels as in the claim 1 are positioned at the same height as the support plate to provide a flat support surface for the flexible screen when the smartphone is fully unfolded.

3. The smartphone with flexible folding screen as in the claim 1 further comprises a display screen on the outer cover of the front body.

4. The smartphone with flexible folding screen as in the claim 1 further comprises a camera lens on top of the screen, a control key below the screen, volumes keys and a screen on/off key on sides, a power jack and an earphone jack on a side.

5. The smartphone with flexible folding screen as in the claim 1 further comprises a keyboard below the inner flexible folding screen covering bottom portions of the inner covers of both the front body and the back body.

6. The smartphone with flexible folding screen as in the claim 1 further comprises a channel inside the front body and a channel inside the back body along the bottom edge and the two channels form a continuous channel when the smartphone is fully unfolded, a sliding pin to fit in the channel and the pin can be push to be partially in the channels of both the front body and the back body and thereby locking the smartphone at a stable and fully unfolded position.

7. The smartphone with flexible folding screen as in the claim 1 further comprises a plurality of mechanisms to maintain the swing panels at the same level as the support plate when the smartphone is at the fully unfolded state.

8. The smartphone with flexible folding screen as in the claim 7 wherein one of the plurality of mechanisms for keeping the swing panels at the same level as the support plate comprises one or more metal strips extending from the underneath of the outer sections of the inner surfaces of both the front body and the back body and in contact with the underneath surfaces of the inner sections of the inner surfaces and exerting pressure to the inner sections from the underneath and one or more barrier elements on the underneath edges of the inner sections which restricts the upward movement of the inner section from move above the center strip and thereby keeping all sections and the center strip as a flat backing surface for the flexible screen.

9. The smartphone with flexible folding screen as in the claim 7 wherein one of the plurality of mechanisms for keeping the swing panels at the same level as the support plate comprises one or more compression springs underneath each of the inner sections of the inner surfaces and the springs sustain an upward pressure on the inner sections and one or more strings of a constant length between the inner sections of the inner surfaces and the outer shell to restrict the upward swing of the inner sections pressured by the springs to a flush level with the center strip.

10. The smartphone with flexible folding screen as in the claim 7 wherein one of the plurality of mechanisms for keeping the swing panels at the same level as the support plate is to have the flexible screen attached to the inner sections so that when the smartphone is being folded the inner sections swing with bending and folding of the flexible screen but remain attached to the flexible screen, as the smartphone is unfolded the edges of inner sections swing with the flattening of the flexible screen to be close proximity to the edges of the center strip, furthermore one or more small magnets and barrier elements are fixed to the underneath of the inner section edges and the center strip contains ferrous metal, thereby the attraction force of the magnets to the ferrous metal in the center strip keeps the inner sections in flush with the center strip.

11. The smartphone with flexible folding screen as in the claim 7 wherein one of the plurality of mechanisms for keeping the swing panels at the same level as the support plate comprises one or more springs from the inner surface of outer cover to exert upward pressure on the inner sections, one or more magnets and barrier strips on the side of the inner sections adjacent to the center strip, a center strip of the flexible screen with rigid backing, and when the smartphone folds the flexible screen curves at the two ends of the rigid backing strip.

12. The smartphone with flexible folding screen as in the claim 1 further comprises a steering element attached to the end of one end rod of the connection element in the form of strip and the steering element is squeezed between the edges of the front body and the back body to keep the support plate at the same position as the inner covers to form a flat surface for the flexible screen.

13. A smartphone with flexible folding screen comprises: a front body, a back body, an external screen on the front cover of the front body, a flexible folding inner screen expanding over the inner covers of the front body and the back body, an elongated connection element having two end rods as pins of hinges to connect the front body and the back body on the side and a middle section with flat surface as a support plate to support the flexible screen, a pair of swing panels positioned next to the two sides of the support plate and flexibly jointed to the inner covers on the far side from the support plate and can swing downward when pressed from above, furthermore the flexible screen is permanently attached to the inner covers of both the front body and the back body, furthermore the front body and the back body have empty spaces below the swing panels to allow the swing panels to swing downward toward the outer covers, while the smartphone folds the folding of the flexible screen forces the swing panels to swing to create space for the flexible screen to have a curved folding and thereby prevent creasing of the flexible screen.

14. The smartphone with flexible folding screen as in the claim 13 further comprises one or more pressure elements underneath the swing panels to press the swing panels upward and one or more barrier elements at the edge of the swing panels adjacent to the support plate to restrict the swing panels from being pressed above the level of the support plate and thereby keeping the flexible screen on a flat backing surface when the smartphone is fully unfolded.

15. The smartphone with flexible folding screen as in the claim 13, whereas the connection element further comprises a steering element in the form of strip at the end of one of the end rods and the steering element is squeezed between the edges of the front body and the back body when the smartphone is fully unfolded to keep the support plate facing upward.

16. The smartphone with flexible folding screen as in the claim 13, whereas the axis line of the hinges is slightly above the inner covers of the front body and the back body and the front body and the back body are flexibly jointed with the back surface of the support plate with flexible membrane connecting between the outer covers of the front body and the back body and the back of the support plate.

* * * * *